United States Patent
De Mersseman

(10) Patent No.: US 7,414,569 B2
(45) Date of Patent: Aug. 19, 2008

(54) VEHICULAR RADAR SENSOR WITH DISTRIBUTED ANTENNA

(75) Inventor: Bernard Guy De Mersseman, Rochester Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 199 days.

(21) Appl. No.: 11/431,240

(22) Filed: May 10, 2006

(65) Prior Publication Data

US 2007/0262897 A1 Nov. 15, 2007

(51) Int. Cl.
*G01S 13/00* (2006.01)
(52) U.S. Cl. .............................. 342/59; 342/70; 342/118
(58) Field of Classification Search ................... 342/70, 342/58, 118
See application file for complete search history.

(56) References Cited

U.S. PATENT DOCUMENTS

| | | | |
|---|---|---|---|
| 6,946,946 B2* | 9/2005 | Buswell | 336/229 |
| 2003/0071753 A1* | 4/2003 | Vacanti | 342/173 |
| 2003/0162546 A1* | 8/2003 | Jordan | 455/446 |
| 2004/0032362 A1 | 2/2004 | Andersson et al. | |
| 2004/0119636 A1* | 6/2004 | Edvardsson et al. | 342/124 |
| 2004/0150549 A1* | 8/2004 | Kumon et al. | 342/70 |
| 2004/0174294 A1* | 9/2004 | Arnold et al. | 342/104 |
| 2005/0024261 A1* | 2/2005 | Fujita | 342/174 |
| 2006/0170604 A1* | 8/2006 | Almog et al. | 343/795 |
| 2006/0214838 A1* | 9/2006 | Humphrey | 342/70 |

FOREIGN PATENT DOCUMENTS

WO WO 02/04980 A1 1/2002

OTHER PUBLICATIONS

Ban-Leong Ooi, "A double-Π stub proximity feed U-slot patch antenna", Antennas and Propagation, IEEE Transactions on☐☐vol. 52 Issue: 9 Sep. 2004 , pp. 2491-2496☐☐.*

* cited by examiner

*Primary Examiner*—Thomas H. Tarcza
*Assistant Examiner*—Timothy A Brainard
(74) *Attorney, Agent, or Firm*—Sally J Brown; Brinks Hofer Gilson & Lione

(57) ABSTRACT

The radar sensor system includes a radar module, a plurality of antenna units, and a signal carrier. The plurality of antenna units are in communication with the radar module and distributed across a sensing region. The antennas may be connected in a series configuration and, further, may form a loop configuration with the radar module. As such, the radar module may include a centralized signal processor unit configured to receive analog signals from each antenna unit.

18 Claims, 1 Drawing Sheet

VEHICULAR RADAR SENSOR WITH DISTRIBUTED ANTENNA

BACKGROUND

1. Field of the Invention

The present invention generally relates to a radar sensor system for a motor vehicle.

2. Description of Related Art

Remote sensing systems, such as, parking aid systems have become prevalent in the automobile industry. These systems utilize sensors which detect obstacles near the vehicle and indicate their presence to the vehicle operator. Parking aid sensing systems require very short range capabilities and a very wide field of view. Typically, the field of view is at least as wide as the car width. To date, many parking aid systems have been implemented with ultrasonic sensors. The short range and wide field of view requirements can be fulfilled at a moderate cost using multiple individual ultrasonic sensors. As vehicles require more and more functionality, system requirements have expanded encompassing everything from parking aid systems to crash anticipation systems. Crash anticipation systems detect objects which the vehicle may collide with. If an input is determined by a system controlled to be implemented, various automatic crash preparation steps can be taken. For pre-crash detection systems, sensors require all of the functions mentioned above, as well as, all weather capability, quick response times, and improved accuracy. For these reasons, radar technology may be more appropriate than ultrasonic sensors for many vehicle applications. However, to date, most radar systems have been designed with too narrow a sensing region for most pre-crash applications.

In view of the above, it is apparent that there exists a need for an improved radar sensor system for a vehicle.

SUMMARY OF THE INVENTION

In satisfying the above needs, as well as overcoming the enumerated drawbacks and other limitations of the related art, the present invention provides an improved radar sensor system for a vehicle.

The radar sensor system in accordance with this invention includes a radar module, a plurality of antenna units, and a signal carrier. The plurality of antenna units are in communication with the radar module and distributed across a sensing region. A signal carrier connects the plurality of antenna units to the radar module and may include a coaxial cable or waveguide.

The antenna units may include planar antennas such as a patch antenna. Patch antennas are small, durable and well suited for vehicle applications. The patch antenna may be configured as a direct feed antenna unit or a proximity feed antenna unit. The antenna units may be connected in a series configuration and, further, may form a loop configuration with the radar module. In that configuration, the radar module may include a centralized signal processor unit configured to receive radio frequency signals from each antenna unit. Using a centralized processor will reduce cost, antenna unit size, and system complexity. The radar module provides a millimeter wave radio frequency transmission signal to the antenna units that is preferably above 5.8 GHz and under 24 GHz. In this range, the transmission signal will be less susceptible to environmental noise present in vehicle applications.

Based on the transmission signal, the radar module captures two time of flight measurements. The radar module determines the range of an object from the antenna unit closest to the object based on the two time of flight measurements. In addition, the radar module determines the location of an object relative to the center line of the signal carrier based on the two time of flight measurements. The range and location of the object may be used to alert vehicle occupants and may be provided to other vehicle control systems.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
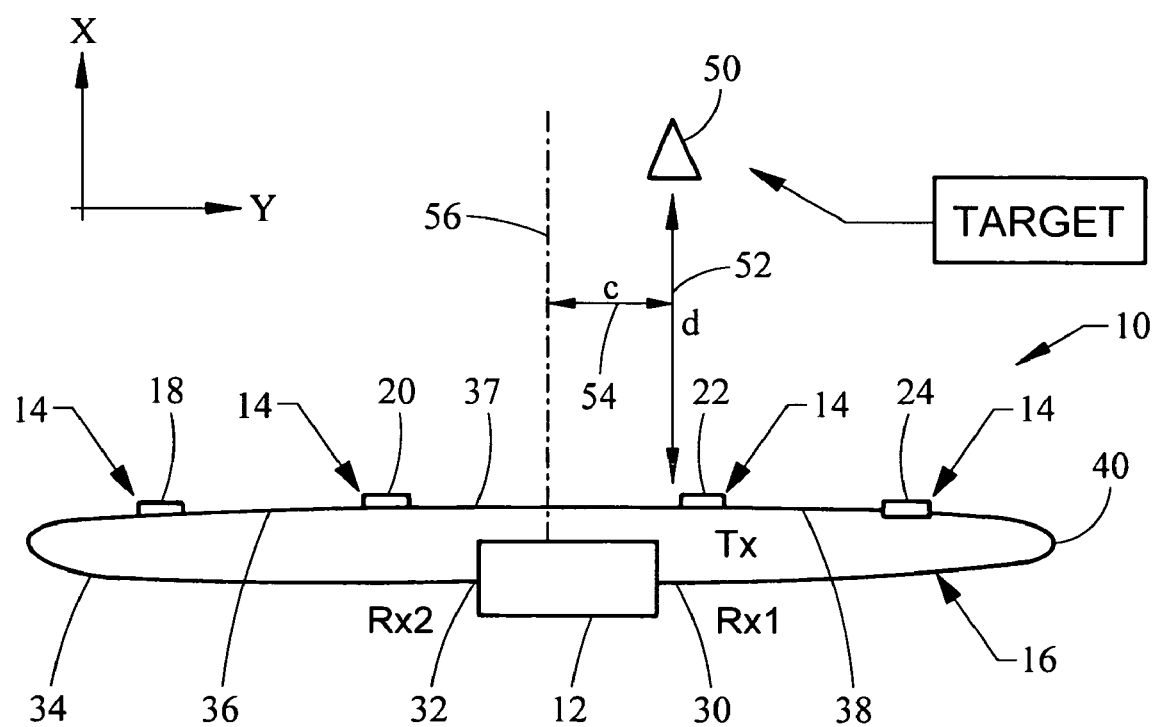
FIG. 1 is a schematic view of a radar sensor system in accordance with one embodiment of the present invention.

Referring now to FIG. 1, a system embodying the principles of the present invention is illustrated therein and designated at 10. As its primary components, the system 10 includes a radar module 12, a plurality of antenna units 14, and a signal carrier 16. The radar module 12 is configured to transmit and receive at a millimeter wave radar signal frequency. By operating at 24 GHz, for example, the system may take advantage of a very wide bandwidth emission allowed by the FCC regulation that is particularly compatible with parking aid and precrash application requirements. The radar module 12 is in communication with the antenna 14 units through the signal carrier 16. The signal carrier 16 may comprise a waveguide or a coaxial cable that is configured to operate at about 24 GHz. One such signal carrier is produced by Andrew Corporation of Orland Park, Ill. (Product Number FSJO36-50) that operates up to 31 Ghz. The antenna units 14 may include a planar antenna, such as a patch antenna. Patch antennas can operate at a very high frequency and can provide a very wide bandwidth consistent with the requirements of parking aid or pre-crash applications. The sensor units 14 are distributed across a sensing region and several methods may be used to couple the signal carrier 16 with the antenna units 14, such as proximity feed, direct feed, or other known coupling methods within the art. For example, the antenna module unit can be a cylindrical patch antenna energized by a common feed or a patch feed antenna on a ceramic substrate that is fed directly.

In the embodiment shown in FIG. 1, the antennas 14 are distributed across the sensing region and connected to a single radar module 12 including a single processing unit. Accordingly, the radio frequency analog signal from each of the antenna units 14 is processed by the single processing unit of the radar module 12. Each of the antenna units 14 may be connected in electrical series with the other antenna units and the radar module. In addition, the sensor units 14 and the radar module 12 may be connected in series forming a loop configuration such that the series of antenna units 14 have two connections to the radar module 12. Accordingly, the radar module 12 has a first connection 30 that may be used as a transmit (Tx) and receive (Rx1) connection to the antenna units 14. A second connection 32 of the radar module 12 may be used only as a receive (Rx2) input. Accordingly, the first connection 30 may be in communication with a first sensor unit 24 along a first signal carrier portion 40. Similarly, a second signal carrier portion 38 connects the first antenna unit 24 to a second antenna unit 22. A third signal carrier portion 37 connects the second antenna unit 22 to the third antenna unit 20. Likewise, a fourth signal carrier portion 36 connects the third antenna unit 20 to the fourth antenna unit 18, while signal carrier portion 34 closes the loop by connecting the fourth antenna unit 18 to the second connection 32 of the radar module 12.

When the radar module 12 transmits the radar signal, it is provided from the first connection 30 to the first antenna unit 24, the second antenna unit 22, the third antenna unit 20, and the fourth antenna unit 18 sequentially. Each antenna unit receives the radar signal transmitted by the radar module 12 at a slightly different time due to the differing path lengths between the radar module 12 and each of the antenna units 14. For example, when transmitting the signal to the first antenna 24, the signal must only travel along the signal carrier portion 40. Whereas transmitting the signal to the fourth antenna unit requires that the signal travel along signal carrier portions 40, 38, 37, and 36.

The transmitted signal is radiated by the antenna units 14 and may intercept an object 50. As such, the radiated signal is reflected off of the object 50 and may be received back by one or more of the antenna units 14. Accordingly, the radar module 12 may determine the position of the object 50 based on two time of flight measurements. The two time of flight measurements may include: (1) the time of flight between the transmit signal (Tx) at the first connection 30 and the receipt (Rx1) of the reflected signal off of the object 50 at the first connection 30, and (2) the time of flight between the transmit signal (Tx) at connection 30 and the receipt (Rx2) of the reflection off of the object 50 at the second connection 32. According to these two time of flight measurements, the radar module 12 may calculate the range (d) of the target 50 relative to the closest antenna unit, denoted by line 52, and the location (c) of the object 50 relative to the center line 56 of the signal carrier 16, as denoted by line 54.

As such, the sum of the time of flight [Tx; Rx1] and the time of flight between [Tx; Rx2] will yield the range (d) of the object 50 relative to the closest antenna unit. This relationship is described by equation 1 provided below.

$$\tau[Tx;Rx1]+\tau[Tx;Rx2]=2*d+l \quad (1)$$

where l is the length of the signal carrier and d is the range measured.

Further, the difference between the time of flight [Tx; Rx1] and the time of flight [Tx; Rx2] yields the location (c) of the object 50 relative to the center line 54 of the signal carrier 16. This relationship is described in equation 2 below.

$$\tau[Tx;Rx1]-\tau[Tx;Rx2]=-c \quad (2)$$

Based on the range (d) and location (c) of the object, the controller 12 can make an assessment of the object 50. Further, by analyzing successive measurements, the controller 12 can determine the likelihood of a crash condition and transmit information about the object 50 including the range (d) and location (c) to vehicle safety system or alarm systems to alert and protect the vehicle occupants.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. A radar sensor system for a vehicle, the radar sensor system comprising:
   a radar module;
   a plurality of antenna units distributed across a sensing region of the vehicle, each antenna unit of the plurality of antenna units being in communication with a centralized signal processor unit of the radar module; and
   a signal carrier connecting the plurality of antenna units to the radar module; and
   wherein the plurality of antenna units are connected in electrical series and form a loop configuration.

2. The radar sensor system according to claim 1, wherein the signal carrier comprises a cable.

3. The radar sensor system according to claim 2, wherein the cable comprises a coaxial cable.

4. The radar sensor system according to claim 1, wherein the signal carrier comprises a waveguide.

5. The radar sensor system according to claim 1, wherein the plurality of antennas comprises a plurality of planar antennas.

6. The radar sensor system according to claim 5, wherein the plurality of planar antennas comprise a plurality of patch antennas.

7. The radar sensor system according to claim 1, wherein the plurality of antenna units are configured as direct feed antenna units.

8. The radar sensor system according to claim 1, wherein the plurality of antenna units are configured as proximity feed antenna units.

9. The radar sensor system according to claim 1, wherein the centralized signal processor unit is configured to receive an analog transmission signal from each antenna unit of the plurality of antenna units.

10. The radar sensor system according to claim 1, wherein the radar module provides a transmission signal to the plurality of antenna units.

11. The radar sensor system according to claim 10, wherein the transmission signal is millimeter wave signal about 24 GHz.

12. The radar sensor system according to claim 1, wherein the radar module is configured to calculate two time of flight measurements.

13. The radar sensor system according to claim 12, wherein the radar module is configured to measure a distance from an object to an antenna unit of the plurality of antenna units closest to the object.

14. The radar sensor system according to claim 13, wherein the radar module is configured to measure the distance according to the relationship:

$$\tau[Tx;Rx1]+\tau[Tx;Rx2]=2*d+l$$

where d is the distance and l is the length of the signal carrier.

15. The radar sensor system according to claim 12, wherein the radar module is configured to measure the location of an object relative to a center line of the signal carrier.

16. The radar sensor system according to claim 15, wherein the location is measured according to the relationship:

$$\tau[Tx;Rx1]-\tau[tx;Rx2]=-c$$

where c is the location of the object relative to the center line.

17. A radar sensor system for a vehicle, the radar sensor system comprising:
- a radar module;
- a plurality of antenna units in communication with the radar module, the antenna units being distributed across a sensing region;
- a signal carrier connecting the plurality of antennas to the radar module, wherein the plurality of antenna units being configured in series connection to form a loop configuration; and
- wherein the radar module includes a centralized signal processor unit configured to receive an analog transmission signal from each antenna unit of the plurality of antenna units to determine a position of an object.

18. The radar sensor system according to claim 17, wherein the radar module is configured to generate two time of flight measurements, the radar module is configured to measure the distance from an object to the antenna unit closest to the object according to the relationship:

$$\tau[Tx;Rx1]+\tau[Tx;Rx2]=2*d+l$$

where d is the distance and l is the length of the signal carrier; the radar module also being configured to measure the location of an object relative to the center line of the signal carrier according to the relationship:

$$\tau[Tx;Rx1]-\tau[Tx;Rx2]=-c$$

where c is the location of the object relative to the center line.

* * * * *